United States Patent
Wang et al.

(10) Patent No.: US 8,591,628 B2
(45) Date of Patent: Nov. 26, 2013

(54) WATERLESS HUMIDIFIER FOR RESIDENTIAL AND COMMERCIAL FURNACES

(75) Inventors: Dexin Wang, Indian Creek, IL (US); William E. Liss, Libertyville, IL (US); Richard A. Knight, Brookfield, IL (US)

(73) Assignee: Gas Technology Institute, Des Plaines, IL (US)

( * ) Notice: Subject to any disclaimer, the term of this patent is extended or adjusted under 35 U.S.C. 154(b) by 301 days.

(21) Appl. No.: 13/076,514

(22) Filed: Mar. 31, 2011

(65) Prior Publication Data

US 2011/0169177 A1 Jul. 14, 2011

Related U.S. Application Data

(63) Continuation-in-part of application No. 12/033,314, filed on Feb. 19, 2008, now Pat. No. 7,972,416.

(51) Int. Cl.
*B01D 53/22* (2006.01)
(52) U.S. Cl.
USPC .................. 95/52; 95/43; 95/45; 96/4; 96/5; 126/116 R
(58) Field of Classification Search
USPC ................... 95/43, 45; 96/4, 5; 126/116 R
See application file for complete search history.

(56) References Cited

U.S. PATENT DOCUMENTS

| | | | |
|---|---|---|---|
| 2,517,499 A * | 8/1950 | McGrath | 62/93 |
| 3,735,559 A | 5/1973 | Salemme | |
| 3,980,605 A | 9/1976 | Steigelmann et al. | |
| 4,583,996 A | 4/1986 | Sakata et al. | |
| 4,875,908 A | 10/1989 | Kikukawa et al. | |
| 5,236,474 A | 8/1993 | Schofield et al. | |
| 5,622,605 A * | 4/1997 | Simpson et al. | 203/10 |
| 5,660,048 A * | 8/1997 | Belding et al. | 62/94 |
| 5,690,372 A * | 11/1997 | Jans | 292/169 |
| 5,738,023 A | 4/1998 | Mennink | |
| 5,753,009 A | 5/1998 | Sirkar et al. | |
| 6,413,298 B1 | 7/2002 | Wnek et al. | |
| 6,490,862 B1 * | 12/2002 | Beerlage et al. | 60/670 |

(Continued)

OTHER PUBLICATIONS

Findley, M. E., "Vaporization Through Porous Membranes", I & EC Process Design and Development, vol. 6, No. 2, 226-230, Apr. 1967.
Niu, Jianlei et al., "Potential Energy Savings for Conditioning Fresh Air with a Membrane-Based Energy Recovery Ventilator", ASHRAE Transactions: Research, pp. 54-63, Jul. 13, 2010.

(Continued)

*Primary Examiner* — Jason M Greene
*Assistant Examiner* — Anthony Shumate
(74) *Attorney, Agent, or Firm* — Pauley Petersen & Erickson

(57) ABSTRACT

A method and apparatus for humidifying residential and commercial buildings in which a flue gas generated by a residential or commercial furnace is provided to one side of a porous liquid water transport membrane and habitable space air is provided to an opposite side of the porous liquid water transport membrane in an amount sufficient to provide a habitable space air to flue gas volume flow rate ratio of at least 8.3:1. At least a portion of the water vapor in the flue gas is condensed, providing condensed liquid water which is passed through the porous liquid water transport membrane to the habitable space air side of the porous liquid water transport membrane. On the habitable space air side of the membrane, the condensed liquid water is evaporated into the habitable space air, producing humidified habitable space air which is provided to the rooms of the residential and commercial buildings. Beneficially, no supplemental water source is required for the humidification process.

13 Claims, 4 Drawing Sheets

(56) References Cited

U.S. PATENT DOCUMENTS

| | | | |
|---|---|---|---|
| 6,517,607 | B2 | 2/2003 | Rabovitser et al. |
| 6,708,517 | B1* | 3/2004 | Piao et al. .................... 62/324.1 |
| 2006/0060183 | A1* | 3/2006 | Hess ........................ 126/110 R |
| 2006/0147773 | A1 | 7/2006 | Steinshnider et al. |
| 2007/0266962 | A1* | 11/2007 | Stone et al. ................... 122/7 R |
| 2009/0205490 | A1 | 8/2009 | Wang et al. |
| 2010/0047634 | A1* | 2/2010 | Nguyen et al. ................. 429/17 |
| 2010/0065442 | A9* | 3/2010 | Saffell et al. ............... 205/785.5 |
| 2010/0203400 | A1 | 8/2010 | Calis et al. |
| 2011/0067610 | A1* | 3/2011 | Latimer et al. ............... 110/342 |
| 2011/0226039 | A1* | 9/2011 | Roland et al. ................ 73/23.31 |
| 2011/0247603 | A1* | 10/2011 | Dempsey et al. ......... 126/116 R |
| 2012/0318142 | A1* | 12/2012 | Weber et al. .................... 95/189 |

OTHER PUBLICATIONS

Kadylak, David Erwin, "Effectiveness Method for Heat and Mass Transfer in Membrane Humidifiers", University of British Columbia, pp. i-iii, Apr. 2009.

Nasif, Mohammad Shakir et al., "Heat and Mass Transfer in Air to Air Enthalpy Heat Exchangers", 6th World Conference on Experimental Heat Transfer, Fluid Mechanics, and Thermodynamics, Matsishima, Miyagi, Japan, Apr. 17-21, 2005, pp. 1-7.

Sirkar, K. K. et al., "Novel Membrane and Device for Direct Contact Membrane Distillation-Based Desalination Process", U.S. Department of the Interior, Bureau of Reclamation, Technical Service Center, Water Treatment Engineering and Research Group, Mar. 2001, pp. i-52.

* cited by examiner

WATERLESS HUMIDIFIER FOR RESIDENTIAL AND COMMERCIAL FURNACES

CROSS-REFERENCE TO RELATED APPLICATION

This application is a continuation-in-part application of our co-pending U.S. patent application Ser. No. 12/033,314, filed 19 Feb. 2008.

BACKGROUND OF THE INVENTION

1. Field of the Invention

This invention relates to a method and apparatus for humidifying air in habitable spaces using the water vapor from moisture-laden flue gas produced by residential or commercial furnaces. In one aspect, this invention relates to a "waterless humidification" method and apparatus for residential and commercial buildings. By "waterless humidification," we mean humidification without the addition of supplemental water, i.e., without any water other than the water obtainable from moisture-laden flue gas. In one aspect, this invention relates to a method and apparatus for humidifying air using a liquid water transport membrane in which water vapor from the moisture-laden flue gas is condensed and the condensed (liquid) water is transported through the membrane for evaporation into an air stream.

2. Description of Related Art

Methods and apparatuses for the selective removal of one or more components from a gaseous mixture are well-known. U.S. Pat. No. 5,753,009 teaches a method and apparatus for selective removal of one or more components from a multi-component gas/vapor mixture by membrane fractionation. The membrane fractionation gas removal system comprises a feed chamber containing gas/vapor mixture, at least one porous membrane having a first side which contacts the gas/vapor mixture in the feed chamber, at least one non-porous membrane having one side which contacts the second side of the porous membrane, which non-porous membrane has a permeability selective to one or more components of the gas/vapor mixture, an exit chamber connected to the second side of the non-porous membrane such that the component exiting the non-porous membrane enters the exit chamber, and an evacuation member connected to the exit chamber for evacuating one or more components from within the exit chamber. U.S. Pat. No. 4,875,908 teaches a process for selectively separating water vapor from a multi-component gaseous mixture in which the multi-component gaseous mixture comprising the water vapor is passed along and in contact with a membrane which is selectively permeable to water vapor. The use of membranes for selective removal of one or more components of a gaseous mixture is also taught by U.S. Pat. No. 4,583,996 (inorganic porous membrane), U.S. Pat. No. 3,980,605 (fibrous semi-permeable membrane), and U.S. Pat. No. 3,735,559 (sulfonated polyxylylene oxide membranes).

Methods and apparatuses for selective removal of water vapor from a gaseous mixture and condensing the separated water vapor to recover its latent heat of vaporization are also known. U.S. Pat. No. 5,236,474 teaches a process for removing and recovering a condensable vapor from a gas stream by a membrane contactor in which a gas stream containing a condensable vapor is circulated on one side of a hollow fiber membrane while cool extraction fluid is circulated on the other side under a total pressure differential. As a result, the condensable vapor in the gas stream is condensed in the gas stream and the condensed vapor, i.e. liquid, permeates the membrane and becomes entrained in the cool extraction fluid. U.S. Pat. No. 6,517,607 B2 teaches a method for removing a condensable component from a process stream in which a first side of a permselective membrane is contacted with a process stream in which is disposed the condensable component. The condensable component is passed through the permselective membrane to a second side of the permselective membrane, forming a condensable permeate. The condensable permeate is then contacted with a liquid stream having a liquid form of the condensable permeate, forming a condensed permeate, which may then be returned to the process which generated the process stream.

In colder climates, air within buildings tends to be dry as a result of which humidification is frequently employed to add more moisture to the air to keep people within the building comfortable and to prevent damage to dry-sensitive objects within the building. Conventional means for humidifying air include adding water by spray, atomizers, or distributors. Typically, in a house, a whole house humidifier installed with the furnace is the best way to humidify all the air in the house. A typical residential humidifier requires a water supply to distribute water along a filter such that hot and dry air coming through the filter will evaporate some of the water so that the air can be humidified. To ensure sufficient wetting of the filter and minimize deposition of dissolved minerals on the filter, a portion of the water supplied to the filter is wasted and goes down to the drain.

Typically, 12 gallons per day of water needs to be added to the air for a house with 3000 $ft^2$, requiring about 105,000 Btu of additional energy per day to vaporize the water. Considering the wasted water to the drain, a consumption of 20 gallons per day of water is typical. However, in addition to conventional water supplies, water is also present in the residential gas furnace flue gas. For example, for a typical 110,000 BTU/hour residential gas furnace flue gas, approximately 30.75 gallons of water per day could be available for this purpose. Extraction of 40% of this water could provide about 12.3 gallons per day, which is enough to meet the typical residential air humidification demand. However, flue gas typically contains contaminants, such as carbon monoxide (CO), carbon dioxide ($CO_2$), and nitrogen ($N_2$), which would contaminate the building air supply, rendering the building uninhabitable.

SUMMARY OF THE INVENTION

Accordingly, it is one object of this invention to provide a method and apparatus for humidifying habitable space air which substantially eliminates the necessity of a water supply required by conventional residential and commercial humidification systems and methods.

It is another object of this invention to provide a method and apparatus for humidifying air for use in residential and commercial buildings which utilizes only the water vapor in flue gas as a water supply for adding humidity to the air supply to the buildings.

It is yet another object of this invention to reduce the amount of energy required for humidification of habitable spaces compared with conventional humidification equipment and methods, in particular, by eliminating the energy employed for the direct evaporation of water used by conventional humidification and methods.

These and other objects of this invention are addressed by a method for humidifying air in habitable spaces or rooms in residential or commercial buildings in which a flue gas comprising water vapor generated by a residential or commercial furnace through the reaction of fuel with combustion air is provided to one side of a porous liquid water transport membrane and air, referred to herein as habitable space air or room air, to be humidified, typically at a temperature in the range of about 40° F. to about 100° F., preferably in the range of about 60° F. to about 80° F., is provided to the opposite side of the porous liquid water transport membrane in an amount sufficient to provide an air to flue gas volume flow rate ratio of at least 8.3:1. At least a portion of the water vapor is condensed in the pores of the membrane, producing liquid water in a sufficient amount to prevent other flue gas components from passing through the membrane, which liquid water is transported through the membrane to the opposite side of the membrane where it is evaporated into the air to be humidified, producing humidified habitable space air which is then provided to the habitable space. By using this membrane separation technique to transfer water vapor from the flue gases to the habitable space air, harmful gaseous components in the flue gas, such as $CO$, $CO_2$, and $N_2$, are substantially blocked from passing through the membrane due to the presence of the liquid water in the membrane, thereby preventing contamination of the humidified habitable space air. In addition to humidifying the air, the higher temperature flue gas also gives up its heat to the lower temperature habitable space air, thereby enabling capture of the energy from the flue gas and increasing efficiency of the air heating and humidification process. Because only substantially pure water passes through the membrane, water contaminant problems associated with the operation of conventional building humidifiers over an extended period of time are avoided. In addition, use of the water vapor in the flue gas in accordance with the method and apparatus of this invention avoids the cost of installing a water supply line and the cost to regularly replace the filter employed in conventional systems due to mineral deposition build up and microbial growth on the filter. The driving force for this transfer of heat and mass is the differential partial pressure of the condensable water vapor across the membrane.

The method of this invention may be carried out in an apparatus comprising a habitable space air conduit providing fluid communication between the apparatus and a habitable space and a humidification element, referred to herein as a transport membrane humidifier, disposed within the habitable space air conduit. The transport membrane humidifier comprises a porous liquid water transport membrane having a flue gas side and an air side opposite the flue gas side which is suitable for selectively passing substantially only condensed water vapor from the flue gas contacting the flue gas side through the porous liquid water transport membrane to the air side of the membrane.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

The invention disclosed herein is a method and apparatus or system for environmentally conditioning spaces or rooms within buildings employing a transport membrane humidifier in which water vapor contained within a flue gas is transferred to the air in the spaces, thereby humidifying the air while blocking undesirable gaseous components in the flue gas from passing into the air, and in which the water vapor in the flue gas is the sole source for water used to humidify the air. The driving force for the water vapor to pass through the membrane is the water vapor partial pressure difference between the flue gas and the air to be humidified. That is, the water vapor partial pressure on the flue gas side of the membrane of the transport membrane humidifier is higher than the water vapor partial pressure on the air side of the membrane. The method and apparatus of this invention avoid the use of energy directly for water vaporization as required by traditional home and building humidifiers.

Figure 1:
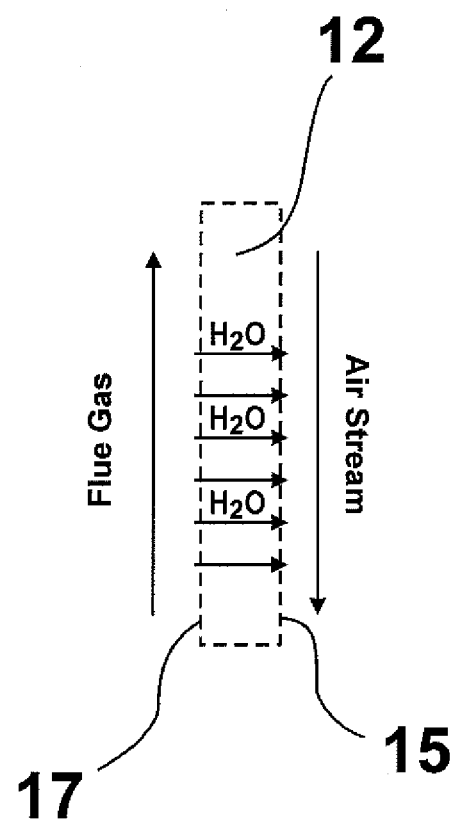
FIG. 1 is a diagram showing the basic concept of this invention.

The basic concept of this invention is shown in FIG. 1. As shown therein, flue gas containing water vapor is provided to the flue gas side 17 of a porous liquid water transport membrane 12. In accordance with one preferred embodiment, pore sizes of the membrane are one of less than or equal to about 50 nanometers (nm). Suitable materials for use as a porous liquid water transport membrane in accordance with one embodiment of this invention are mesoporous ceramics, such as an alumina ceramic. The water vapor condenses in the pores of the membrane resulting in the disposition of liquid water in the pores of the membrane in an amount sufficient to fill the pores and prevent the passage of gaseous components in the flue gas through the membrane. The liquid water is transported through the membrane to the air side 15 of the membrane to which habitable space air is provided, whereby the liquid water is evaporated into the air. During the liquid water transport process, the higher temperature flue gas gives up heat to the lower temperature habitable space air as both sensible and latent heat, thereby increasing energy efficiency. Because only substantially pure water is transported through the membrane, water contaminant problems that often impact the operation of humidifiers over an extended period of time are avoided. In addition, recycling water from the flue gas also avoids the costs of installing a water supply line and the costs of regularly replacing the filter employed in conventional systems due to mineral deposition buildup and microbial growth on its surface.

Figure 2:
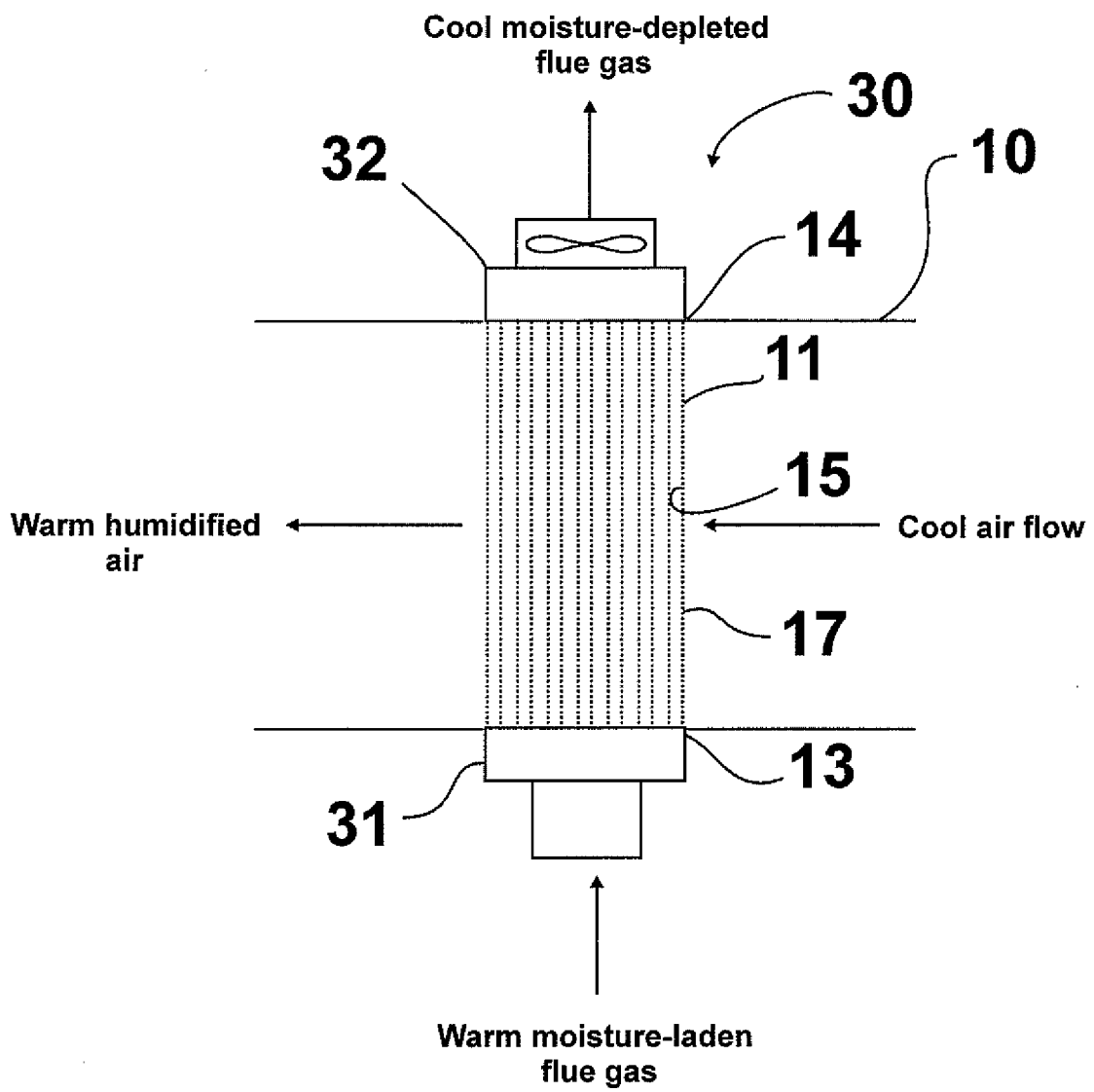
FIG. 2 is a schematic diagram of a transport membrane humidifier in accordance with one embodiment of this invention.

In accordance with one embodiment of this invention as shown in FIG. 2, the transport membrane humidifier 30, shown within a furnace air duct 10, comprises at least one tubular flue gas conduit 11 having a flue gas inlet end 13 connected with a flue gas inlet manifold 31, a flue gas outlet end 14 connected with a flue gas outlet manifold 32, wherein the at least one tubular flue gas conduit is formed by a porous liquid water transport membrane having an air side 15 corresponding to an outer surface of the conduit and a flue gas side 17 corresponding to an inner surface of the conduit. During operation, a dry habitable space air stream flows inside duct 10 upstream of the porous water transport membrane and a water vapor-laden flue gas is introduced through flue gas inlet manifold 31 into the flue gas inlet 13 of tubular flue gas conduit 11. As the water vapor-laden flue gas contacts the surface on flue gas side 17 of the porous liquid water transport membrane, the water vapor in the flue gas condenses within the pores of the membrane, producing liquid water. By virtue of a capillary condensation separation mechanism, the liquid water, and substantially only the liquid water, passes through the membrane to the air side of the membrane. The dry habitable space air flowing through the duct 10 contacts the air side of the membrane, resulting in evaporation of the liquid water into the habitable space air and humidification thereof. The water vapor-depleted flue gas is then exhausted through the flue gas outlet 14 of tubular flue gas conduit 11. Although shown as a tubular structure, it will be appreciated that the method of this invention may be accomplished using a planar membrane, wherein the water vapor-laden flue gas contacts one side of the membrane, resulting in condensation of the water vapor in the membrane, and the air stream contacts the opposite side of the membrane resulting in evaporation of the liquid water passed through the membrane into the air stream.

Figure 3:
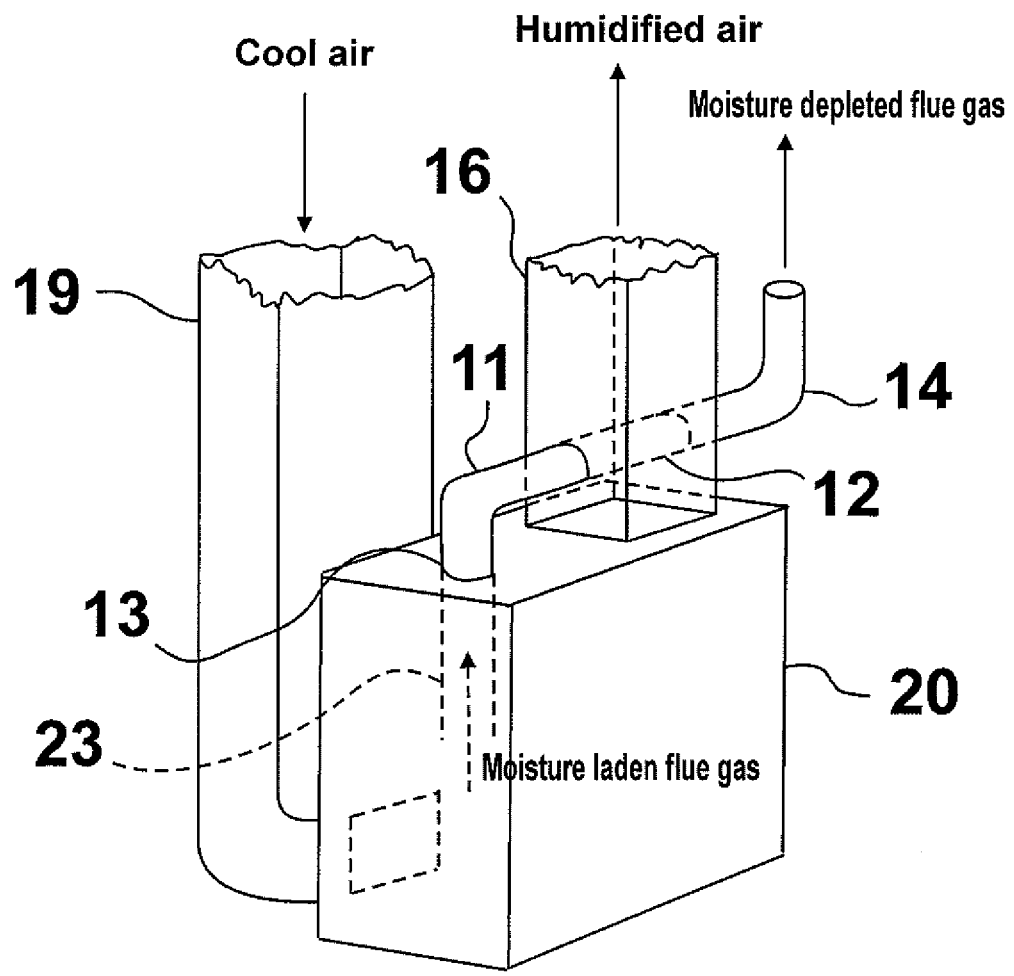
FIG. 3 is a schematic diagram of a building heating and humidification system in accordance with one embodiment of this invention employing a transport membrane humidifier disposed within a conditioned habitable space air conduit or duct.

FIG. 3 shows an apparatus in accordance with one embodiment of this invention in which a porous liquid water transport membrane 12 is disposed within a heated air duct 16, i.e. habitable space air outlet, of a fossil fuel-fired residential or commercial heating system. In this embodiment, cool habitable space air typically from a space within a building containing the heating system is introduced through a cool habitable space air duct 19 into a furnace 20 in which the cool air is heated, producing heated, dry habitable space air. The heated, dry air is transported from the furnace 20 through air duct 16, through which humidified habitable space air is returned to the building space and in which is disposed the porous liquid water transport membrane 12. Flue gas generated by the combustion process in the furnace is exhausted through a flue gas conduit 23 having a flue gas inlet in fluid communication with the furnace combustor and having a flue gas outlet in fluid communication with the flue gas inlet 13 of tubular flue gas conduit 11. In accordance with this embodiment, all of the water vapor-laden flue gas flows through the tubular porous liquid water transport membrane 12 and all of the heated, dry air contacts the outer surface of the membrane, capturing condensed water vapor (liquid water) and heat from the flue gas. This mode of operation provides a potential maximum benefit of air humidification because all of the heated, dry air flows over the porous liquid water transport membrane. However, because the air duct is typically large in size, the porous liquid water transport membrane must be large in size or consist of multiple, smaller tubular elements to match the size of the duct.

Figure 4:
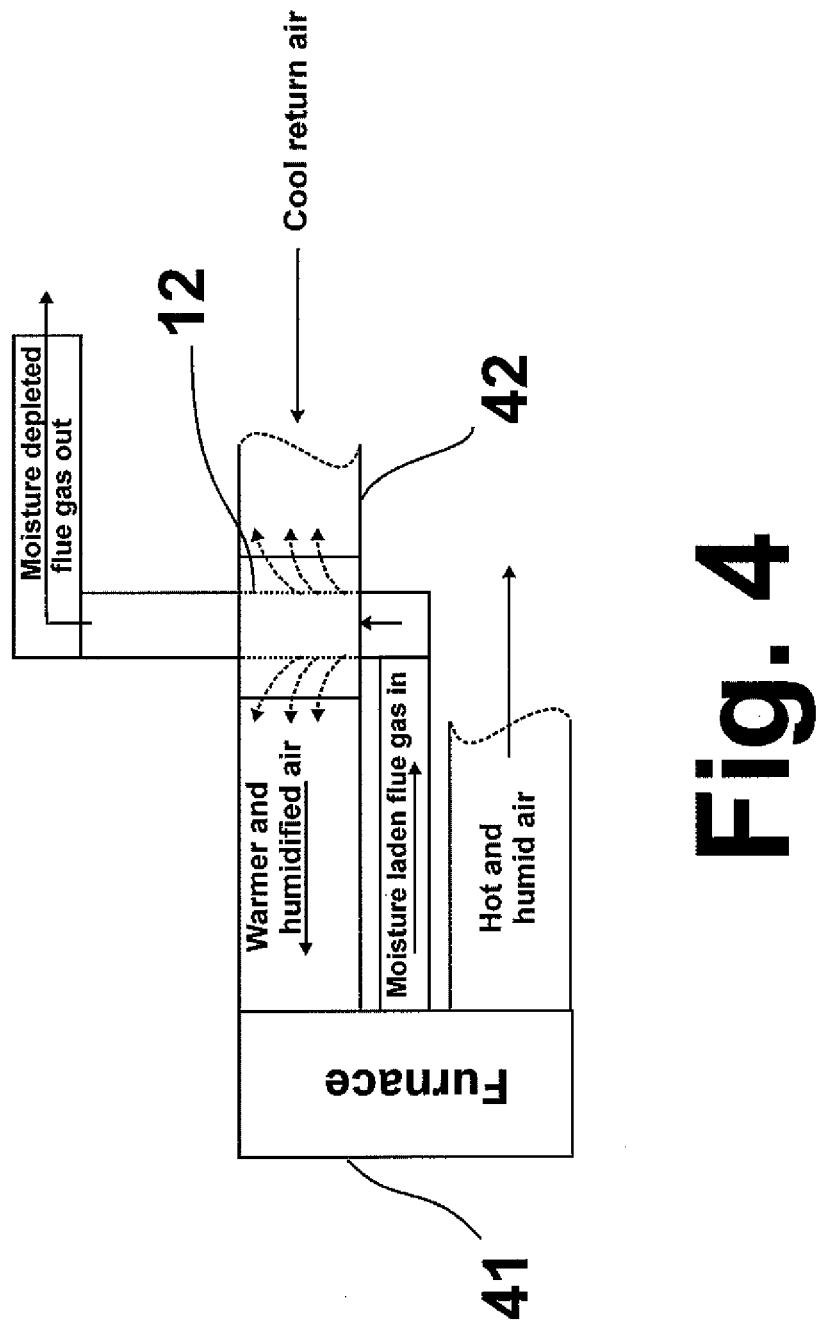
FIG. 4 is a schematic diagram of a building heating system in accordance with one embodiment of this invention in which the permselective liquid water transport membrane is disposed within the return air duct or conduit through which air to be heated and humidified is provided to the furnace.

FIG. 4 shows one operating mode of a building heating system in accordance with one embodiment of this invention in which the porous liquid water transport membrane 12 is disposed in the furnace return air duct or conduit 42 by which habitable space air to be heated is provided to the furnace 41. In accordance with this embodiment, all of the cool habitable space return air is humidified and heated by the flue gas flowing on the flue gas side of the membrane, thereby providing the potential for the maximum benefit of air humidification.

As previously indicated, for a typical house with 3000 ft$^2$, about 12 gallons per day of water are required to humidify the air in the house. In addition, a significant amount of water is discarded from conventional humidification systems in the form of waste water, resulting in a total water consumption for humidification of about 20 gallons per day.

In order to ensure sufficient water vapor condensation in the porous liquid water transport membrane to preclude the passage of any undesirable gaseous components in the flue gas through the membrane into the humidified habitable space air, we have discovered that a habitable space air to flue gas volume flow rate ratio of at least 8.3:1 is required. Operation at a lower ratio will not provide the required water vapor condensation within the membrane. 8.3:1 is the ratio at which water vapor in the flue gas begins to condense in the membrane. However, it will be appreciated that at such a low ratio the evaporation rate on the air side of the membrane would be relatively low and, as such, insufficient for providing the desired level of humidification. Accordingly, for most applications, a higher air to flue gas volume flow rate ratio will be required. In accordance with one embodiment of this invention, the habitable space air to flue gas volume flow rate ratio is in the range of about 20:1 to about 200:1. In accordance with one preferred embodiment, the habitable space air to flue gas volume flow rate ratio is in the range of about 40:1 to about 100:1. In accordance with one particularly preferred embodiment, the habitable space air to flue gas volume flow rate ratio is in the range of about 40:1 to about 70:1.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for humidifying a habitable space comprising the steps of:
    providing a water vapor-containing flue gas having a first water vapor partial pressure generated by one of a residential furnace and a commercial furnace to a flue gas side of a porous liquid water transport membrane;
    providing habitable space air having a second water vapor partial pressure less than said first water vapor partial pressure to a habitable space air side of said porous liquid water transport membrane opposite said flue gas side in an amount sufficient to provide a habitable space air to flue gas volume flow rate ratio of at least 8.3:1;
    condensing at least a portion of said water vapor in said flue gas in an interior of said porous liquid water transport membrane, forming liquid water in said interior in an amount sufficient to substantially prevent all gaseous components in said flue gas from passing through said porous liquid water transport membrane to said habitable space air side;
    passing said liquid water to said habitable space air side of said liquid water transport membrane;
    evaporating said liquid water on said habitable space air side into said habitable space air, producing humidified habitable space air; and
    providing said humidified habitable space air to said habitable space.

2. The method of claim 1, wherein said habitable space air to flue gas volume flow rate ratio is in a range of about 8.3:1 to about 200:1.

3. The method of claim 2, wherein said habitable space air to flue gas volume flow rate ratio is in a range of about 40:1 to about 70:1.

4. The method of claim 1, wherein said habitable space air is at a temperature in a range of about 40° F. to about 100° F.

5. The method of claim 4, wherein said habitable space air is at a temperature in a range of about 60° F. to about 80° F.

6. The method of claim 1, wherein all of said humidified habitable space air is produced using only said water vapor in said flue gas.

7. The method of claim 1, wherein said porous liquid water transport membrane is in a form of a tube having an inside surface and an exterior surface.

8. The method of claim 7, wherein said inside surface corresponds to said flue gas side of said porous liquid water transport membrane and said exterior surface corresponds to said habitable space air side of said porous liquid water transport membrane.

9. The method of claim 7, wherein said inside surface corresponds to said habitable space air side of said porous liquid water transport membrane and said exterior surface corresponds to said flue gas side of said liquid water transport membrane.

10. The method of claim 1, wherein said porous liquid water transport membrane is disposed within a heated habitable space air conduit through which said humidified habitable space air is provided to said habitable space.

11. The method of claim 1, wherein said porous liquid water transport membrane is disposed in a habitable space air return conduit through which said habitable space air to be heated from said habitable space is provided to said one of said residential furnace and said commercial furnace for heating.

12. The method of claim 1, wherein said flue gas is at a higher temperature than said habitable space air, whereby a portion of heat energy in said flue gas is transferred to said habitable space air.

13. The method of claim 1, wherein said porous liquid water transport membrane has pore sizes less than about 50 μm or equal to about 50 μm.

* * * * *